UNITED STATES PATENT OFFICE.

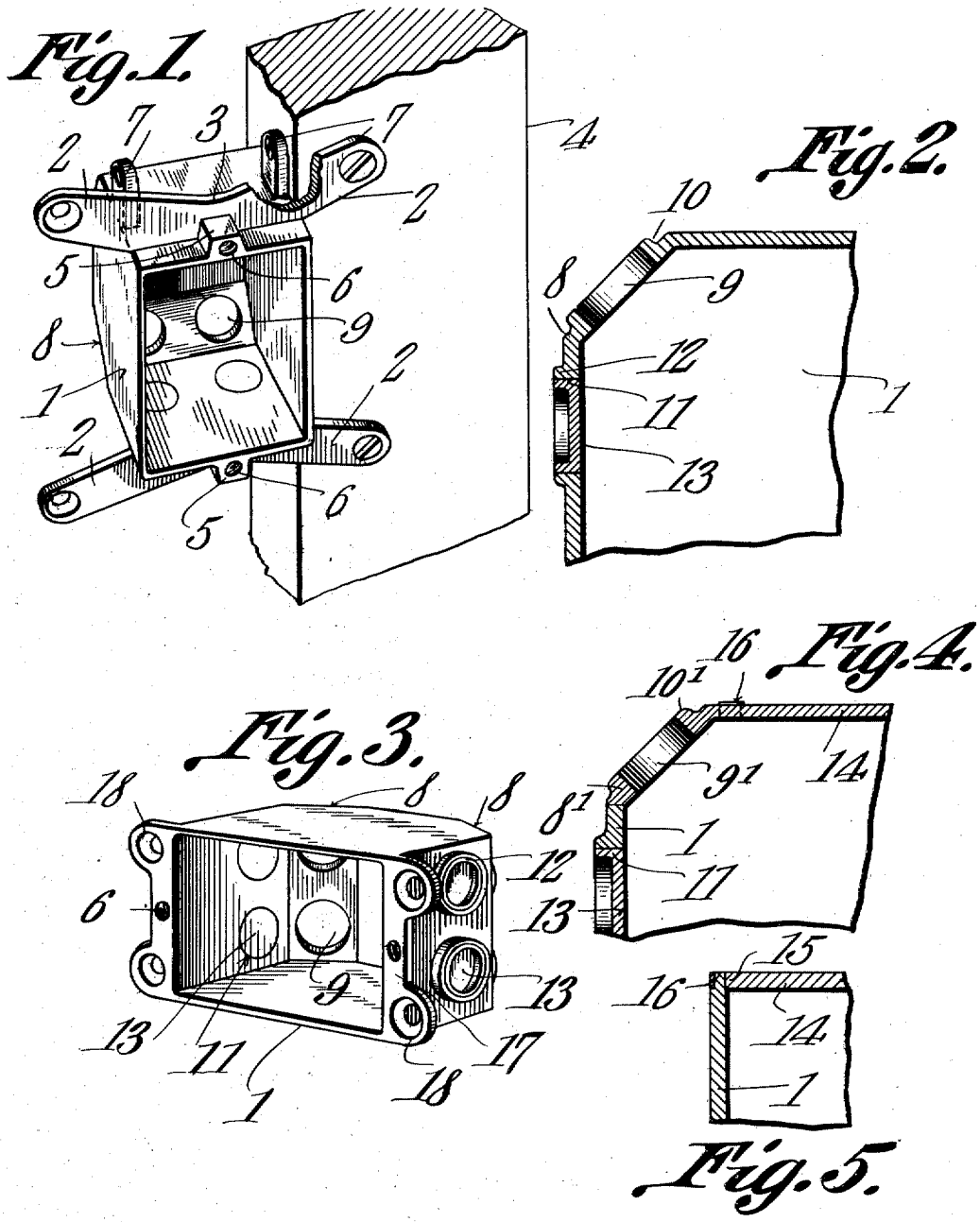

CYRIL CHARLES MAISON, OF CLEVELAND, OHIO, ASSIGNOR, BY MESNE ASSIGNMENTS, TO THE ECONOMY SWITCH BOX & MFG. COMPANY, A CORPORATION OF OHIO.

SWITCH BOX OR RECEPTACLE.

982,841.  Specification of Letters Patent.  Patented Jan. 31, 1911.

Application filed February 15, 1910. Serial No. 543,955.

*To all whom it may concern:*

Be it known that I, CYRIL CHARLES MAISON, a citizen of the United States, residing at Cleveland, in the county of Cuyahoga and State of Ohio, have invented a new and useful Switch Box or Receptacle, of which the following is a specification.

This invention has reference to improvements in switch boxes or receptacles and is designed to provide a switch box or receptacle which shall meet underwriters' requirements and at the same time is adapted to thin partitions such as are found in connection with sliding doors so that the box may be placed close to the door casing without interference with the usefulness of the box and without the necessity of providing special supports for the box since the invention is adapted to be secured directly to the studding adjacent to the door opening.

Other features of the invention as well as those mentioned will be apparent from the following detail description taken in connection with the accompanying drawings forming a part of this specification, in which drawings, Figure 1 is a perspective view of a switch box as applied to studding. Fig. 2 is an enlarged sectional view of a portion of the switch box shown in Fig. 1. Fig. 3 is a perspective view of a box or receptacle adapted to a base-board. Fig. 4 is a view similar to Fig. 2 but showing a different form of the invention. Fig. 5 is a detail section showing the manner of securing the back to the box or receptacle when such back is made separate from the body of the box or receptacle.

Referring to the drawings and more particularly to Fig. 1 there is shown a rectangular structure in the form of a switch box or receptacle 1 of sufficient depth to receive an electric switch and in the particular showing of the drawing the cross sectional area of the box is sufficient to house such a switch, but it will be understood that where a plurality of switches or other electrical devices are to be housed in one box the size of the box will be proportionately larger than the indication of Fig. 1.

The boxes or receptacles 1 are usually made longer than their width and on the ends of the box there are formed ears 2 projecting beyond the long sides of the box and at an angle thereto and at an angle to the ends of the box, the ears on each end of the box being integrally joined at an obtuse angle one to the other, the junction 3 forming a strengthening web for the ears. The ears 2 project beyond the plane of the long sides of the box to such an extent as to be readily attached to a stud, indicated at 4, which stud may be an ordinary 2×4 stud such as is commonly employed in partition work in house-building. At the junction point of the ears 2 on the same end of the box there is formed a boss 5 having its outer end flush with the outer end of the box, or otherwise related to the outer end of the box for the attachment of the switch or other electrical apparatus to be housed within the box, the bosses 5 being provided with threaded passages 6 for the reception of screws.

In boxes or receptacles as ordinarily constructed, where designed to receive electrical switches or like apparatus, there are provided ears for securing these boxes, but the ears are so related to the boxes that it becomes necessary for the workmen installing the electrical apparatus to secure spaced braces between two adjacent studs for the support of such box, and these boxes are of such depth that they cannot be installed in the shallow available room in partitions into which sliding doors move.

By placing the ears 2 at a suitable distance back of the front end of the box 1 the box may be made of ample depth and at the same time may be secured to the broad face of the stud without the rear end of the box projecting into the partition to a greater depth than the narrow face of the stud, it being customary to set studding in partitions designed to receive folding doors, flatwise with the broader faces parallel with the surface of the finished walls.

The underwriters' rules require that boxes such as the boxes or receptacles of the present invention shall be secured in place by at least three screws. By the use of a single brace or support extending from one stud to the next adjacent stud, two of the ears may be secured to a stud and a third ear to the brace or support thus complying with the underwriters' rules.

Where it is not desirable to use the brace and thereby save the cost of placing such brace, each box 1 is provided with additional ears 7 so located that when two of the ears 2 projecting from the same long side of the box are secured by screws to a stud 4, a third screw may be passed through an ear 7 into the same stud thus providing the three screw supports required by the underwriters' rules.

To adapt the box to the shallow available space and at the same time provide entrance for conductors, the rear corners of the ends of the box are beveled as indicated at 8 and these beveled walls may have through passages 9 around each of which is formed an annular boss or rib 10. Furthermore the ends of the box may be provided with passages 11 each likewise provided with an annular boss or flange 12 thus adapting the box for various arrangements of conductors. The passages 9 being at an angle to both the back and side walls because of the beveled portions 8 through which the passages are formed, cause the flexible conduits traversing said passages to bind, since such conduits must be bent to enter or leave the box through the angularly situated passages 9. The conduits are therefore firmly held to the box by the walls of the passages 9, and cannot be accidentally displaced after having been once installed. Since all of the passages 9 and 11 will not usually be needed those not needed are filled with an easily removable plug or closure 13 which may be made of lead or other suitable material.

Under some circumstances it is desirable that the rear end of the box should be made separate from the body of the box and such structure is indicated in Fig. 4, where the rear end 14 is shown as a separate piece from the body 1 and includes the beveled portions 8' agreeable to the beveled portions 8 of the structure of Figs. 1 and 3 and in the beveled portion may be apertures 9' with peripheral ribs or bosses 10' agreeable to the like structures of Figs. 1, 2 and 3.

The beveled corners may be omitted and these corners made right angle as indicated in Fig. 5 and in such structure the back 14 may be formed with rivet holes or passages 15 while the body 1 is formed with rivet extensions 16 adapted to the passages 15 and when the parts are assembled these rivet members 16 may be headed in the usual manner to secure the back 14 to the body portion 1. The same means of fastening the back to the body portion may be used in connection with the structure of Fig. 4.

Where the box or receptacle is designed to be used in a base-board the structure of Fig. 3 may be employed and in this case the ends of the mouth of the receptacle are provided with flanges 17 terminating in ears 18 perforated for the passage of screws. The structure may be otherwise similar to the structure of Fig. 1.

The improved switch box or receptacle may be employed for either new or old work and the structure of Fig. 1 is particularly adapted for partitions where the depth of available space is limited.

What is claimed is:—

A box or receptacle for electrical apparatus provided with sustaining ears extending beyond the sides and ends of the box at an angle to both and located at a distance from the front of the box or receptacle, and other ears extending from the ends of the box between the first named ears and the rear of the box, the second named ears each having one face in the plane of the corresponding side of the box.

In testimony that I claim the foregoing as my own, I have hereto affixed my signature in the presence of two witnesses.

CYRIL CHARLES MAISON.

Witnesses:
EMANUEL KLIMES,
WM. SVARE.